March 19, 1940.  J. W. LUBBERHUIZEN  2,194,286
ELECTRICAL DRIVING DEVICE FOR A RAPIDLY ROTATING MEMBER,
SUCH AS A SPINNING POT FOR ARTIFICIAL SILK
Filed Nov. 21, 1938  2 Sheets-Sheet 1

Inventor:
Jan Willem Lubberhuizen
By Williams, Bradbury, McCaleb & Hinkle,
Attys Patented Mar. 19, 1940

2,194,286

UNITED STATES PATENT OFFICE 2,194,286

ELECTRICAL DRIVING DEVICE FOR A RAPIDLY ROTATING MEMBER, SUCH AS A SPINNING POT FOR ARTIFICIAL SILK

Jan Willem Lubberhuizen, Lobositz, Sudetenland, Germany, assignor to N. V. Internationale Spinpot Exploitatie Maatschappij "Isem," Doetinchem, Netherlands, a corporation of the Netherlands Application November 21, 1938, Serial No. 241,618
In the Netherlands September 17, 1937

1 Claim. (Cl. 172—36)

The invention relates to an electrical driving device for rapidly rotating members, in particular spinning pots for artificial silk, comprising a vertical spindle supported in a hollow rotor shaft. The invention has for its object a convenient and practical embodiment of such a driving device so as to provide for a very simple insertion and removal of the electromotor as well as of other essential elements of the device into and from a surrounding casing.

According to the invention the casing surrounding the vertical spindle, the hollow rotor shaft, a rotor mounted on said shaft and a stator forming with said rotor the electromotor driving the hollow rotor shaft and thereby the spindle, comprises a lower portion and an upper portion or cap through which latter portion the spindle freely protrudes, said cap being adapted to be connected to and removed from the lower casing portion by a simple manipulation and constituting when connected to said lower casing portion the sole means for keeping together the spindle, rotor, rotor shaft and bearings of the driving device, while preventing them from being taken apart.

According to the invention the spindle may be axially slidably but non-rotatably coupled with the hollow rotor shaft so as to be adapted to be readily inserted into and withdrawn from the hollow rotor shaft after removal of the cap. The hollow rotor shaft may according to the invention be supported exclusively underneath the stator or rotor in bearings of such a type, that after removal of the cap it may be axially withdrawn or inserted without disturbance of any connection.

In a practical embodiment according to the invention the lower end of the spindle has such a profile that simply after insertion of the spindle into the hollow rotor shaft a relative rotation of said elements is prevented. To this end the spindle may have a transverse slot open at the bottom and, in the operative position of the spindle, straddling a transverse pin secured in the lower end of the hollow rotor shaft.

At its upper end the spindle may be supported by radial springs, rotating along with the rotor and spindle, which springs need not be attached to the spindle nor to the rotor.

The spindle will be unitary or it may consist of two or more parts. It may be flexible so as to adjust itself under its proper elasticity independently of any springs.

According to the invention the rotor shaft may be supported in combined axial- and radial-thrustbearing adapted to receive the axial pressure. As an alternative one of the said bearings may be an axial thrustbearing, receiving the axial pressure, and the other bearing may be a tubular bearing. The motor cap may be provided with an abutment limiting upward displacement of the rotor shaft and e. g. consisting of a sleeve which may be flanged and which surrounds the spindle with some play in such a manner, that after the cap has been secured to the stator the essential elements such as the rotor shaft, carrying the rotor, the spindle and the bearings are held together.

According to the inventtion the motor may be supported upon elastic e. g. rubber feet or shock absorbers, rigidly secured to the casing.

This way of resiliently supporting the motor is generally known. In known constructions, however, the particular requirements to be fulfilled by these supporting elements were not sufficiently taken into account. The invention is based upon the consideration that the motor, upon being started and as long as the number of revolutions has not yet reached the first critical number, should be able to follow the oscillating movements of the spinning pot. The motor should then be able to make an oscillating movement on the shock absorbers which movement at the top is much stronger than at the bottom. Therefore the motor has a tendency to tilt whereafter it is returned by its own weight into the vertical position. When supporting the motor on a plurality of shock absorbers some of them will be slightly lifted and the oppositely located shock absorbers will be slightly compressed. If the motor has surpassed its critical number of revolutions then during the rotation of the spinning pot the axis of gravity remains in position and the motor should then be able to perform a small precession motion at the bottom. Based on this insight the invention consists in this that the shock absorbers each have a portion that is freely slidable over centering pins or in centering holes of the foundation or stationary motor support whereas between the upper side of said pins or holes and the lower side of the motor casing there is a laterally non-clamped or free shock-absorber-length.

The shock absorbers are thus vertically compressible while at the same time the amount of play between the shock absorber portion surrounding the centering pin or inserted into the centering hole of the stationary support enables the motor to be tilted and to fall back in a limited degree. The motor once having reached its normal number of revolutions, the laterally free shock-absorber-length referred to above may be slightly distorted by the shearing stresses produced; in the case of a laterally clamped in shock absorber this would be impossible and also in the case of a shock absorber rigidly attached to the motor by means of a bolt or pin passing therethrough. Thus, according to the invention, a free shock absorber length affording the shock absorbing effect is combined with a shock absorber length for the centering of the motor.

Further features of the invention will be described hereinafter with reference to the accompanying drawings, in which Fig. 1 is a vertical central section of an electrical driving device according to the invention e. g. of a spinning pot for artificial silk.

Figure 1:
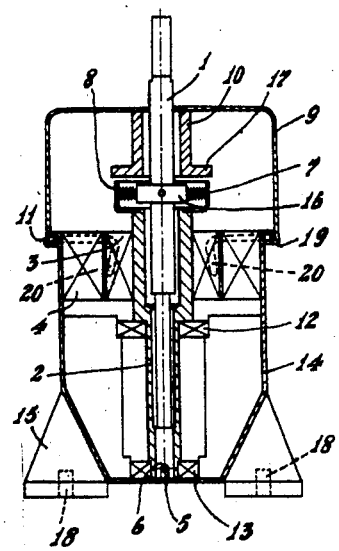
Figure 2:
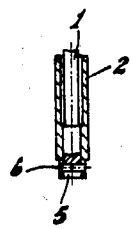
Fig. 2 is a section perpendicular to that shown in Fig. 1 of a detail.

In Figs. 1 and 2 a vertical spindle 1, upon the upper end of which a spinning pot may be mounted, has been inserted into the hollow shaft 2 of a rotor 3 which together with a stator 4 constitutes the electromotor driving the spindle. The spindle is axially slidable but non-rotatable with respect to the hollow rotor shaft by reason of the fact that the lower end of the spindle is provided with a slot 5 which in the position shown in Figs. 1 and 2 receives a transverse pin 6 secured in the lower end of the hollow rotor shaft (see Fig. 2). The spindle may be removed from the hollow rotor-shaft by taking it out axially and upwards. Radial or transverse springs 7 are arranged in a spring chamber 8 secured to the top of the rotor 3 and rotating along therewith. The springs serve to laterally support the spindle at the upper end by means of a collar 16. A cap 9 has been put over the spindle 1 and is provided with a sleeve portion 10 provided at its lower end with a flange 17, said sleeve surrounding the spindle with the necessary play and preventing the spindle or the rotor from freely moving upwards. The cap at its lower edge is provided with an annular bead 11 adapted to receive under tension an annular spring 19 for securing the cap to a stator casing 14. The spring is of the type shown in dotted lines and is constituted by a resilient wire in the form of a split ring having outwardly projecting ends 20, 20 adapted to be moved towards one another so as to reduce the diameter of the spring and thereby unlock the cap 9. Insertion and removal of the spindle as well as of the motor and bearings is thus very simple. Screw connections need not be established or unscrewed. It will be clear that the invention in its broad respect is not limited to the use of the particular spring referred to above. Other connecting means such as a bayonet joint to connect the cap to and disconnecting it from the stator casing 14 by a simple manipulation might also be used.

Figure 6:
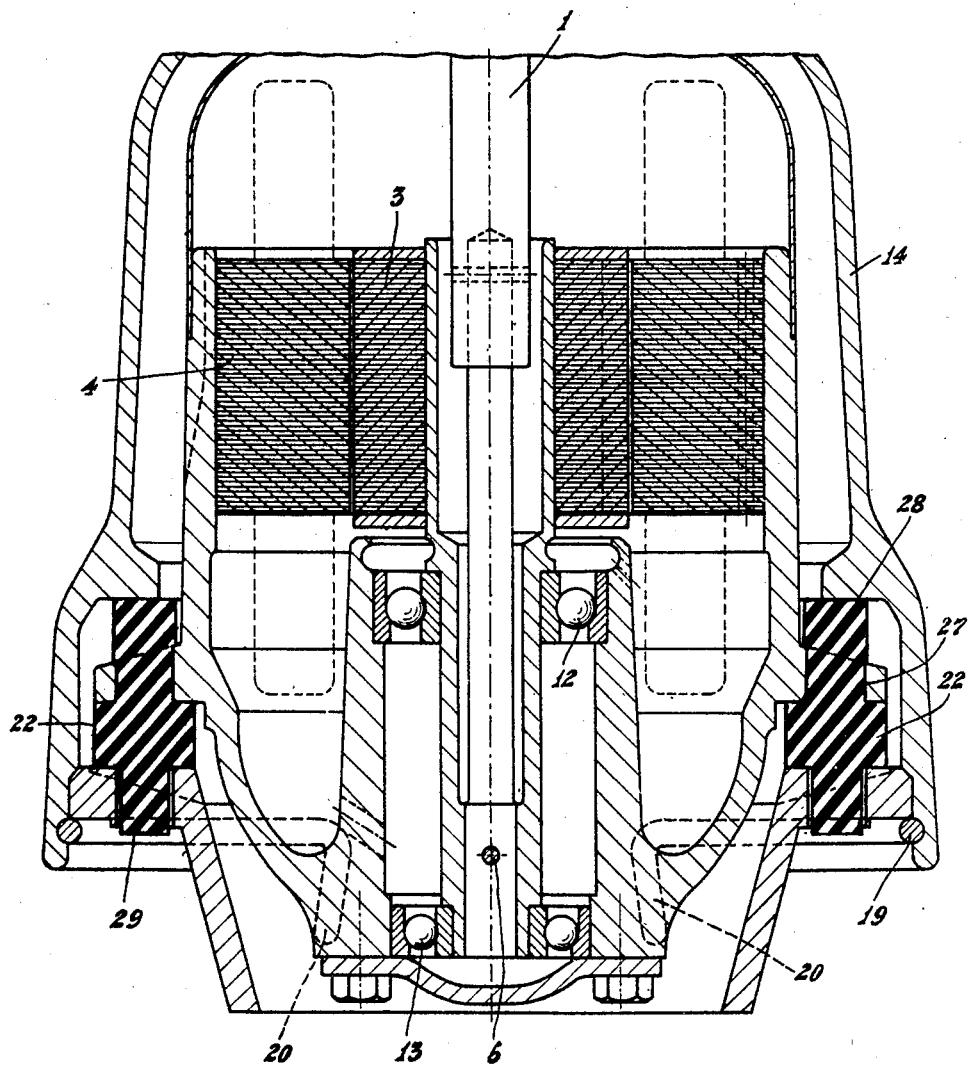
Fig. 6 is a vertical section of an electrical driving device for a spinning pot essentially corresponding to Fig. 1 but illustrating various structural details which in Fig. 1 have only been shown schematically.

The hollow rotor shaft 2 is supported exclusively underneath the stator 4 in two superposed and spaced bearings 12 and 13 shown schematically in Fig. 1 and in detail in Fig. 6. They may both be combined axial-and-radial-thrust-bearings, or one of them may be a bearing of this type and the other one a tubular bearing, the essential point being that they enable the rotor shaft and rotor to be inserted and removed in axial direction. The stator casing 14 is supported upon elastic, e. g. rubber, feet 15 provided with vertical holes 18, so that the entire driving device may be mounted freely and in a centered position upon a stationary support without being rigidly connected thereto.

Within the spirit of the invention it is possible to couple the lower spindle end to the hollow rotor shaft in any other way than shown in Fig. 1. The spindle at its lower end might have laterally projecting ribs received in corresponding vertical longitudinal grooves in the lower wall portion of the hollow rotor shaft so that the spindle may be inserted from above with said ribs into the grooves of said wall portion which to this end will have to be thicker than the wall portion located thereabove.

Figure 3:
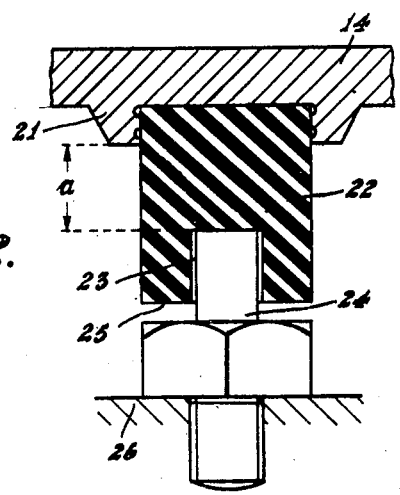
Figs. 3, 4 and 5 are vertical sections of three embodiments of shock absorbers for an electromotor-driven vertical centrifugal machine according to the invention.

In Fig. 3 in the lower side of the casing 14, in a recess defined by a depending collar 21, the upper end of a rubber shock absorber 22 is clamped. This shock absorber is in its bottom provided with a recess 23 into which projects with some circumferential play a centering pin 24 upon the upper surface of which the rubber shock absorber is supported with the bottom of its recess. The lower end surface 25 of the shock absorber is located at some distance above the foundation or stationary support 26 into which the centering pin 24 is secured. It follows that there is a laterally non-clamped or free shock absorber length "a" between the lower side of the casing 14 and the upper side of the pin 24 and that further the rubber shock absorber will be compressed between said surfaces. The rubber is thus confined between said surfaces and is not subjected to tensile stress.

Figure 4:
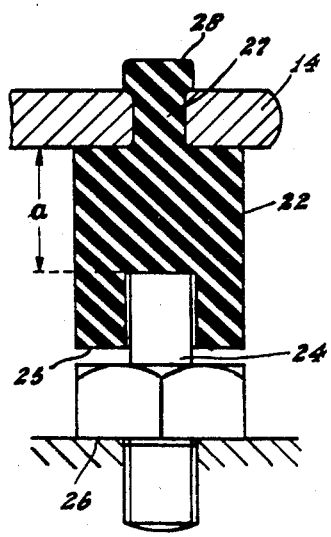

In Fig. 4 the rubber shock absorber 22 is clamped in the casing 14 by means of a relatively thin portion 27 having at its upper end a collar or thickened head 28. For the rest this embodiment is equivalent to that according to Fig. 3.

Figure 5:
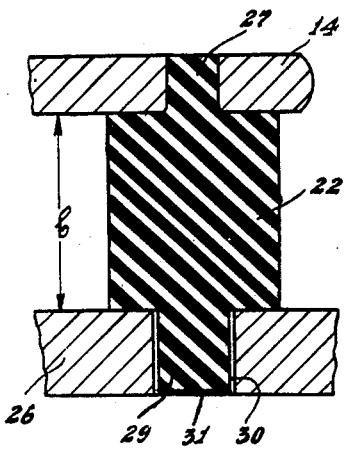

In Fig. 5 the rubber shock absorber 22 is provided at its upper end with a collarless relatively thin portion 27 clamped in the casing 14. At its lower end the shock absorber 22 is provided with a relatively thin portion 29 which is inserted with circumferential play into a hole 30 of the stationary support 26. The shock absorber 22 is entirely solid.

In Figs. 3 and 4 the hollow or tubular lower end of the shock absorber 22 and the centering pin 5 have essentially the same centering function as the thin portion 29 of the shock absorber and the hole 30 in the stationary support in Fig. 5. Also in the latter embodiment the rubber of the shock absorber is confined between the stationary support 26 and the lower side of the casing 14 and again there is a laterally non-clamped or free shock-absorber-length, denoted by "b", between the casing and the stationary support. The lower end of the shock absorber at 31 is entirely free.

In Fig. 6 it has been clearly shown that the bearings 12, 13 of the hollow rotor shaft 1 are combined radial-axial-thrustbearings. The shock-absorbers are of the type shown separately in Fig. 5. The spindle is of the type disclosed e. g. in the U. S. patent specification No. 2,089,933, but it may of course be of other type, e. g. of the type shown in Figs. 1 and 2.

I claim:

A two-part housing for motors and the like comprising a pair of separable housing members, one of said members constituting a cover and the other member a base, said cover having an aperture through the top thereof, an annular sleeve portion projecting downwardly from said cover circumferentially of said aperture, said sleeve portion having an outwardly extending annular flange at its lower edge, said sleeve and aperture adapted to receive the spindle of the motor rotor therethrough, said spindle having a collar fixed thereto adjacent the upper end thereof, said base supporting the stator of the motor and having a pair of spaced bearings for the motor rotor, said cover having an annular bead along the lower edge thereof, a wire spring received within said bead, said base having a laterally extending peripheral flange along its upper edge, said wire spring having a smaller inner circumference than the outer circumference of said lateral flange, said lateral flange being adapted to extend over and frictionally engage the upper side of said spring when said cover is secured to said base, and means for reducing the outer circumference of said spring to conform to or be less than the circumference of said laterally extending flange, whereby said cover and its sleeve may be removed as a unit from said base, said spindle being prevented from upward movement by its collar and a flanged sleeve when the cover is operatively secured to said base.

JAN WILLEM LUBBERHUIZEN.